UNITED STATES PATENT OFFICE.

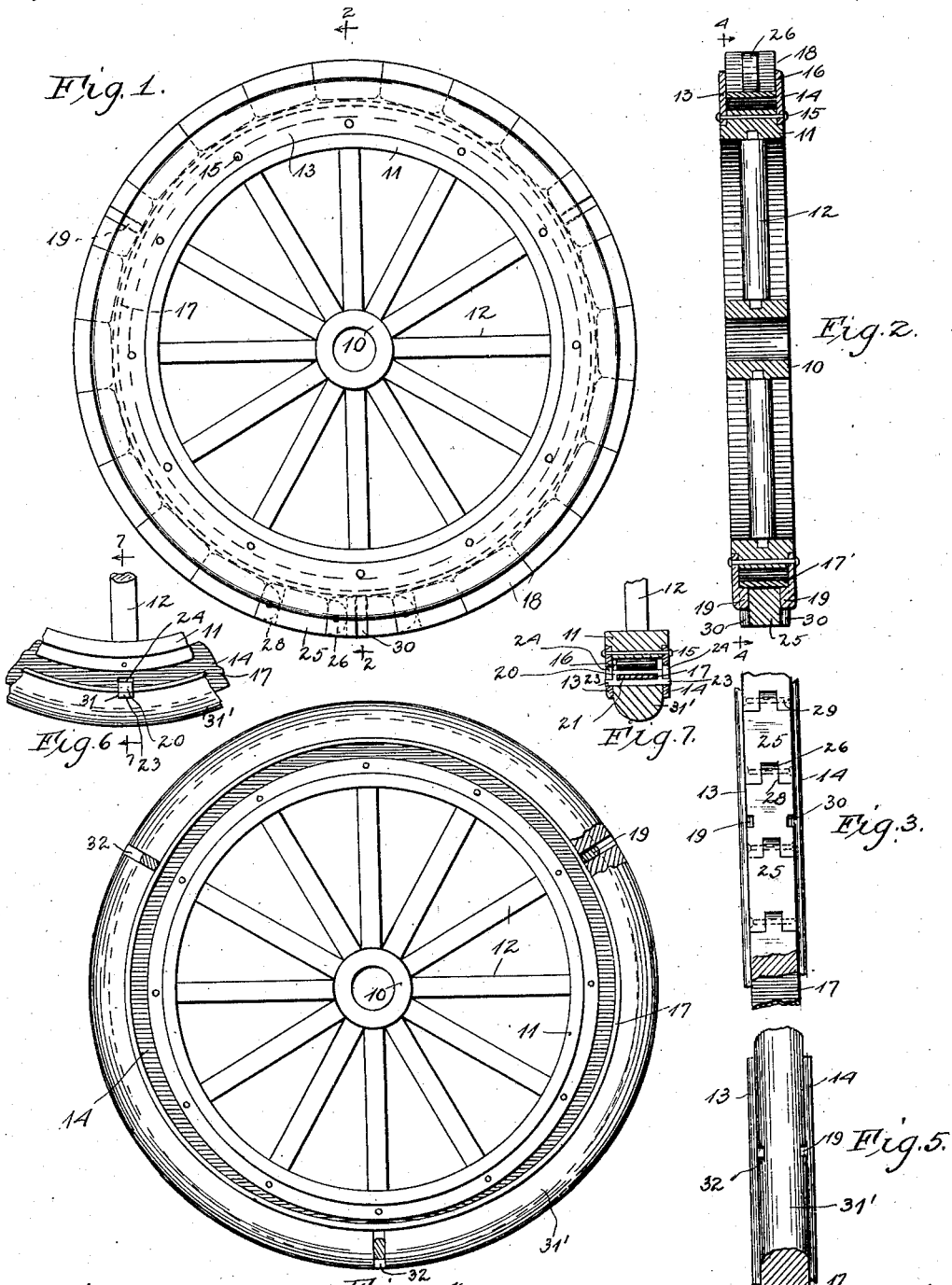

THOMAS RHODUS, OF CHICAGO, ILLINOIS.

VEHICLE-WHEEL.

1,025,483. Specification of Letters Patent. Patented May 7, 1912.

Application filed February 18, 1911. Serial No. 609,510.

*To all whom it may concern:*

Be it known that I, THOMAS RHODUS, a resident of Chicago, in the county of Cook and State of Illinois, have invented certain new and useful Improvements in Vehicle-Wheels, of which the following is a specification.

My invention relates to vehicle wheels, particularly to spring wheels, and contemplates improved features of construction.

Among the objects of the invention are to provide for improved operation of the spring member, which is in the form of a circular band of spring metal, such as steel; to provide an improved tread for the wheel in the form of an endless flexible outer tire which may be composed of metallic links or which may be in the form of rubber or similar material; to provide improved coöperation of the tread member with the spring member whereby said members together serve to cushion the load on the wheel and to more readily absorb shocks; to provide confining means for the spring member which will prevent bodily movement thereof but which will not hinder its free and unimpeded distortion during travel of the vehicle to enable its spring qualities to operate efficiently at all times; and in general to provide a more simple and efficient wheel of the class referred to.

One embodiment carrying out the features of my invention is disclosed in the following drawings, in which—

Figure 1 is a side elevational view of a wheel, Fig. 2 is a sectional view taken on plane 2—2, Fig. 1, Fig. 3 is a view of part of the wheel in Fig. 1, looking from the end thereof, Fig. 4 is a view taken substantially from plane 4—4, Fig. 2 and showing a modified form of tread member, Fig. 5 is an end view of part of the wheel of Fig. 4, Fig. 6 is an elevational view of the lower part of a wheel with the front plate removed to show a modified construction of abutment mechanism, and Fig. 7 is a sectional view taken substantially on plane 7—7, Fig. 6.

The inner part of the wheel comprises a hub 10 and a rim or felly 11 connected together by spokes 12, and these parts may be of any well-known construction. Encircling the rim at the sides thereof are the annular plates 13 and 14 whose inner sections are set into the rim 11, as indicated, so that the plates will securely seat on the rim, bolts 15 passing through the plates and rim at suitable intervals to securely bind the plates and rim together. The plates on the outer periphery of the rim form an annular pocket 16 for accommodating a spring member in the form of a flat spring 17 and for accommodating the tread tire part 18. The spring band 17 is confined against bodily movement by suitable abutment mechanism, which may be of various constructions. In the construction shown in Figs. 1 to 5 this abutment mechanism involves lugs 19 extending at suitable intervals from the side plates into the pocket 16, the spring member abutting against the inner ends of the lugs to be confined thereby against bodily travel but to be free to become flattened or radially distorted. In the arrangement shown in Figs. 6 and 7 the abutment mechanism is in the form of attachments 20 which may be secured at suitable intervals to the spring band. As shown, each attachment comprises a sleeve 21 which has side extensions or lugs 23 slidable in radial slots 24 cut in the side plates. There should be not less than three such abutment mechanisms, although more may be used, provided there not be so many as to interfere with flattening or distorting of the spring band to exert its spring qualities when the wheel is under load. When the wheel is not under load the band in Figs. 1 to 5 engages with all the abutment lugs and is concentric with the wheel axis, and in the arrangement in Figs. 6 and 7 when the wheel is not under load the lugs 23 all abut against the outer wall of the slots 24, and the band is concentric with the wheel axis.

In the arrangement of Figs. 1 to 3 the tread or outer tire part is in the form of an endless chain composed of specially formed links 25 which may be of metal or other suitable material. Each link, as shown, has at one end a tongue 26 and at its opposite end a groove 28, the tongues and grooves of the adjacent links fitting together, and the links being pivoted together by rods 29 extending through the lugs and grooves, as indicated. This outer tire member fits slidably in pocket 16 between the side plates, and snugly encircles the spring band. In the arrangement of Figs. 1 to 3, in order to accommodate the abutment members or lugs 19 the links adjacent these lugs have channels 30 at opposite sides which slidably receive the lugs, and these links can therefore slide radially and their engagement with the lugs serves also to prevent creeping of the outer tire member. In the arrangement of Figs. 6 and 7 such slots in the outer tire member are not necessary, and these outer members have inner transverse grooves 31 receiving the abutment members 20 and being prevented thereby from creeping. In Figs. 4 and 5 the tread member is integral and in the form of a rubber tire 31' which has channels 32 cut therein at intervals to receive the abutment lugs 19.

As the wheel rolls over the ground under load the lower section of the outer tire member and the hub of the wheel approach each other, and the spring member 17 is flattened and its spring properties resist such relative movement of the rigid inner wheel structure and the outer tire member, and shocks are absorbed by the spring member and also by the outer tire member, if such tire member is of elastic material, such as rubber. The relative movement referred to is indicated in Fig. 4, the spring member being flattened and its lower portion moved away from the lower abutment and the upper part of the spring member more firmly engaging the upper abutments. As the wheel progresses the spring member distorts accordingly to exert its spring action, and the lower parts thereof are successively raised. Thus, while the spring member is at all times free to respond to the varying pressure on the wheel and to exercise its spring action, it is confined by the abutment mechanisms against bodily movement. As the outer tire member engages intimately with the side plates of the wheel, dirt cannot enter, and any dirt which enters the channels 30 or 32 is immediately forced out by the lugs as the wheel compresses during travel. Likewise, dirt cannot enter between the links which are close together.

I thus produce a wheel which has very few parts and which as a whole is of very simple and inexpensive construction, yet which is very resilient and otherwise efficient in cushioning the vehicle and in absorbing shocks. I do not, however, desire to be limited to the precise construction and arrangement shown, as changes and modifications are of course possible which would still come within the scope of my invention, and I therefore claim the following:

1. In a spring wheel, the combination of peripheral sides forming an annular compartment, a spring band within said compartment of considerably less diameter than the external diameter of said sides, abutment lugs disposed at intervals and extending into said compartment from said sides and intimately engaged at their inner sides by said spring band when the wheel is normal, a flexible outer tire surrounding said band and slidable radially in said compartment, said abutment lugs being sufficiently few in number and spaced sufficiently far apart to allow bulging of the sections of the band between said lugs when the wheel is in action and the band compressed, said sides between said lugs offering no impediment to the outward movement of said band.

2. In a spring wheel, the combination of peripheral sides forming an annular compartment, a spring band within said compartment of considerably less diameter than the external diameter of said sides, means associated at intervals with said sides and band for affording intimate outer radial abutting engagements to axially center the band when the wheel is normal, an outer tire surrounding said band and slidable radially in said compartment, said abutting engagements being sufficiently few in number and spaced sufficiently far apart to allow bulging of the sections of the band between said abutting engagements when the wheel is in action and the band compressed, there being nothing between said abutting engagements offering any impediment to the outward movement of said band.

In witness whereof, I hereunto subscribe my name this 15th day of February, A. D., 1911.

THOMAS RHODUS.

Witnesses:
CHARLES J. SCHMIDT,
NELLIE B. DEARBORN.

---

Copies of this patent may be obtained for five cents each, by addressing the "Commissioner of Patents, Washington, D. C."